(12) United States Patent
Ichida et al.

(10) Patent No.: US 7,722,487 B2
(45) Date of Patent: May 25, 2010

(54) FRONT DERAILLEUR WITH MOUNTING FIXTURE

(75) Inventors: Tadashi Ichida, Sakai (JP); Kazuhiro Fujii, Sakai (JP); Yoshihiro Oda, Sakai (JP)

(73) Assignee: Shimano Inc., Osaka (JP)

( * ) Notice: Subject to any disclaimer, the term of this patent is extended or adjusted under 35 U.S.C. 154(b) by 393 days.

(21) Appl. No.: 11/485,424

(22) Filed: Jul. 13, 2006

(65) Prior Publication Data
US 2007/0117666 A1  May 24, 2007

(30) Foreign Application Priority Data
Nov. 21, 2005   (JP)  ............................. 2005-335811

(51) Int. Cl.
*B62M 9/12* (2006.01)

(52) U.S. Cl. ........................................ 474/80

(58) Field of Classification Search .................. 474/80, 474/127; 74/469
See application file for complete search history.

(56) References Cited

U.S. PATENT DOCUMENTS

| | | | |
|---|---|---|---|
| 4,199,997 A | | 4/1980 | Isobe |
| 4,199,998 A | | 4/1980 | Isobe |
| 5,389,043 A | * | 2/1995 | Hsu ............................. 474/80 |
| 6,146,298 A | * | 11/2000 | Nanko .......................... 474/80 |
| 6,270,124 B1 | * | 8/2001 | Nanko .......................... 285/15 |
| 2004/0185975 A1 | * | 9/2004 | Chen ............................ 474/80 |
| 2005/0204846 A1 | * | 9/2005 | Valle et al. .................... 74/469 |

FOREIGN PATENT DOCUMENTS

| | | |
|---|---|---|
| CN | 2597323 Y | 1/2004 |
| EP | 1 547 914 A2 | 6/2005 |
| EP | 1 571 076 A1 | 9/2005 |
| FR | 716698 A * | 12/1931 |
| FR | 2 380 937 | 9/1978 |
| JP | 62-177594 U | 11/1987 |

\* cited by examiner

*Primary Examiner*—Robert A Siconolfi
*Assistant Examiner*—Stephen Bowes
(74) *Attorney, Agent, or Firm*—Global IP Counselors, LLP

(57) ABSTRACT

A bicycle front derailleur is provided with a mounting fixture that is configured to maintain an angular orientation of the front derailleur about a mounting axis parallel to a center axis of a frame tube in a stable manner. The mounting fixture has a bicycle frame fastening part, a front derailleur mounting part and a front derailleur contact part. The bicycle frame fastening part is configured to be fastened to the seat tube. The front derailleur mounting part is disposed on the bicycle frame fastening part and configured to be fastened to the front derailleur so that fine adjustment is possible about the mounting axis disposed at a distance from the seat tube. The front derailleur contact part selectively contacts a side surface of the front derailleur on the side facing the seat tube in a position that is different from that of the front derailleur mounting part.

12 Claims, 6 Drawing Sheets

FRONT DERAILLEUR WITH MOUNTING FIXTURE

CROSS-REFERENCE TO RELATED APPLICATIONS

This application claims priority under 35 U.S.C. §119 to Japanese Patent Application No. 2005-335811. The entire disclosure of Japanese Patent Application No. 2005-335811 is hereby incorporated herein by reference.

BACKGROUND OF THE INVENTION

1. Field of the Invention

This invention generally relates to a bicycle front derailleur that is fastened to the bicycle frame. More specifically, the present invention relates to a mounting fixture for mounting the bicycle front derailleur to a tubular member of the bicycle frame in a manner such that the angular position of the bicycle front derailleur can be finely adjusted relative to an axis that is parallel to a center axis of the tubular member of the bicycle frame.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Recently, bicycle frames have been extensively redesigned. One component that has been extensively redesigned is the bicycle frame and the mounting structures A bicycle front derailleur is sometimes attached to the seat tube (tubular member) of the bicycle frame by a mounting fixture, which is fastened by being welded or screwed to the seat tube of the frame. This mounting fixture is sometimes called a direct-mounting seat. Since such mounting fixtures are fastened to the seat tube beforehand, the chain guide of the derailleur cannot be disposed in a parallel position directly above the front sprocket in the case of systems in which a band is formed as an integral part of the front derailleur, unless the orientation is adjusted about an axis parallel to the seat tube following mounting.

The present invention relates to a front derailleur which is fastened to a bicycle frame and which can be attached to a mounting fixture having a circular arcuate surface so that fine adjustments can be made by rotation about a first axis, and also relates to this mounting fixture.

In the past, therefore, mounting fixtures have included fittings devised so that not only the vertical position can be adjusted, but also the rotation about the axis can be adjusted (e.g., see Japanese Patent Application Laid-Open No. 62-177594). This conventional mounting fixture has a bicycle frame fastening part which is fastened with the aid of a screw to the seat tube, and also has a front derailleur mounting part which is disposed on the bicycle frame fastening part and which can be fastened so that fine adjustments are possible by rotation about a first axis in a position distant from the seat tube. The front derailleur mounting part is integrally formed by being bent from the bicycle frame fastening part. Long slots are formed at this location above and below, and the front derailleur mounting part has a first fine adjustment washer which has a circular arcuate protruding surface used for fine adjustment and disposed on the front surface of the slot, and a second fine adjustment washer which has a circular arcuate recessed surface in contact with the first fine adjustment washer. Fastening bolts are passed through these two washers and slots, and are screwed into the front derailleur along the forward-rearward direction, so that the front derailleur can be finely adjusted by rotation about the first adjustment axis. Furthermore, in order to maintain the finely adjusted state about the first adjustment axis, a contact bolt having the configuration of a set screw with a recessed hexagonal socket in contact with the root portion of the front derailleur mounting part bent from the bicycle frame fastening part is disposed in the front derailleur.

When a front derailleur is mounted on such a mounting fixture, the mounting fixture is threadedly fastened to the seat tube in a specified position, and the front derailleur is then fastened in place by the fastening bolt after the vertical position and orientation about the first adjustment axis have been adjusted. In this state, the contact bolt is brought into contact with the front derailleur mounting part so that the adjusted state is maintained. The orientation of the front derailleur about the first adjustment axis therefore tends not to vary even if a force should act on the front derailleur from the chain toward the seat tube during gear shift.

A contact bolt that is disposed in parallel in a position in close proximity to the fastening bolt is used in the abovementioned conventional mounting fixture in order to maintain the adjusted orientation after of the front derailleur about the first adjustment axis. Consequently, a large force is caused to act on the contact bolt by the torque that is generated by the chain, so that there is a danger that the adjusted orientation will vary because of a slight looseness of the screw or the like.

In view of the above, it will be apparent to those skilled in the art from this disclosure that there exists a need for an improved mounting fixture. This invention addresses this need in the art as well as other needs, which will become apparent to those skilled in the art from this disclosure.

SUMMARY OF THE INVENTION

One object of the present invention is to provide to make it possible to securely maintain the orientation of the front derailleur about the first adjustment axis in a mounting fixture for attaching the front derailleur to the frame.

In accordance with a first aspect of the present invention, the foregoing object and other objects can basically be attained by providing a front derailleur mounting fixture that basically comprises a bicycle frame fastening part, a front derailleur mounting part and a front derailleur contact part. The bicycle frame fastening part is configured and arranged to be fastened to a tubular member of a bicycle frame. The front derailleur mounting part is coupled to the bicycle frame fastening part, with the front derailleur mounting part being configured and arranged to fasten a front derailleur for limited rotation adjustment about an adjustment axis disposed at a distance from the tubular member. The front derailleur contact part is configured and arranged to contact a part of the front derailleur facing the tubular member in a position that differs from that of the bicycle frame fastening part such that fine adjustment of an angular position of the front derailleur is provided by the front derailleur contact part in conjunction with the front derailleur mounting part.

In this mounting fixture, the front derailleur is mounted on the front derailleur mounting part after the bicycle frame fastening part has been fastened to the tubular member. In this case, fastening is performed after the orientation of the front derailleur about the first adjustment axis is adjusted. In this state, the front derailleur contact part and the portion of the front derailleur that is disposed on the side of the tubular member are brought into contact with each other. Here, a front derailleur contact part that is in contact with a portion of the front derailleur that is disposed on the side of the tubular member is disposed on the mounting fixture in different position from that of the front derailleur mounting part, and the force that acts on the front derailleur contact part is therefore small. As a result, the orientation of the front derailleur about the first adjustment axis can be securely maintained.

A front derailleur mounting fixture of a second aspect of the present invention is a front derailleur mounting fixture according to the first aspect of the present invention, wherein the front derailleur contact part includes an advancing and retracting part that selectively advances and retracts the front derailleur relative to the bicycle frame fastening part. In this case, the front derailleur contact part can easily be brought into contact with the front derailleur adjusted about the first adjustment axis by the advancing and retracting part. Furthermore, the orientation about the first adjustment axis can also be adjusted by the advancing and retracting part.

A front derailleur mounting fixture of a third aspect of the present invention is a front derailleur mounting fixture according to the second aspect of the present invention, wherein the advancing and retracting part includes a screw. In this case, the front derailleur contact part can be securely brought into contact with the front derailleur adjusted about the first adjustment axis by turning the screw.

A front derailleur mounting fixture of a fourth aspect of the present invention is a front derailleur mounting fixture according to any one of the first to third aspects of the present invention, wherein the front derailleur contact part includes a bolt member arranged to be connected to the front derailleur. In this case, even if the front derailleur is driven in the direction that separates this derailleur from the tubular member, the orientation of the front derailleur does not vary following adjustment.

A front derailleur mounting fixture of a fifth aspect of the present invention is a front derailleur mounting fixture according to any one of the first to fourth aspects of the present invention, wherein the bicycle frame fastening part includes a partial arcuate member with free ends that are configured to be welded to the tubular member. In this case, the structure of the mounting fixture is simplified.

A front derailleur mounting fixture of a sixth aspect of the present invention is a front derailleur mounting fixture according to any one of the first to fourth aspects of the present invention, wherein the bicycle frame fastening part includes a band clamping arrangement. In this case, the orientation of the front derailleur can also be adjusted using the band-clamped portion.

A front derailleur mounting fixture of a seventh aspect of the present invention is a front derailleur mounting fixture according to any one of the first to sixth aspects of the present invention, wherein the front derailleur mounting part is configured to swingably mount the front derailleur to swing freely about the adjustment axis which is disposed parallel to a center axis of the tubular member.

In accordance with an eighth aspect of the present invention, the foregoing object and other objects can basically be attained by providing a front derailleur that basically comprises a base member, a chain guide, a linkage assembly and a mounting fixture. The base member includes a mounting fixture engaging part with a circular arcuate surface that defines an adjustment axis and a fastening structure that defines of a mounting axis that is orthogonal to the adjustment axis. The chain guide is configured to move between a retracted position and an extended position relative to the base member. The linkage assembly is coupled between the base member and the chain guide in order to move the chain guide between the retracted position and the extended position. The mounting fixture contact part is disposed on the base member to advance and retract the base member in a direction along a displacement axis that is generally orthogonal to the adjustment axis and the mounting axis such that fine adjustment of an angular position of the front derailleur is provided about the adjustment axis by movement of the mounting fixture contact part.

When this front derailleur is attached to the mounting fixture, the orientation about the first adjustment axis is adjusted so that the chain guide is disposed in parallel above the sprocket, and the base member is fastened to the mounting fixture. The front derailleur contact part is caused to advance or retract, and the front derailleur contact part is brought into contact with the mounting fixture. Since the front derailleur contact part is disposed so that the front derailleur contact part is brought into contact with the mounting fixture from a different direction than the direction in which the adjusted front derailleur is fastened to the mounting fixture, any force that acts on the front derailleur contact part is small. As a result, the orientation of the front derailleur about the first adjustment axis can be securely maintained.

A front derailleur of a ninth aspect of the present invention is a front derailleur according to the eighth aspect of the present invention, wherein the base member includes a screw hole that is formed along the direction of the displacement axis, and the front derailleur contact part includes a bolt member that is screwed into the screw hole. In this case, fluctuations in the distance to the mounting fixture following adjustment can be securely handled by turning the bolt member.

A front derailleur of a tenth aspect of the present invention is a front derailleur according to the ninth aspect of the present invention, wherein the screw hole extends through the base member in the direction of the displacement axis, and the bolt member is a set screw having a recessed hexagonal socket. In this case, the system can be set so that the set screw does not protrude from the opposite side surface even if the front derailleur contact part is mounted in the screw hole from the opposite surface of the base member that does not face the mounting fixture.

In the front derailleur mounting fixture of the present invention, a front derailleur contact part in contact with a portion of the front derailleur that is disposed on the front derailleur on the side facing the tubular member is disposed on the mounting fixture in a different position from that of the front derailleur mounting part, and the force that acts on the contact par is therefore small. As a result, the orientation of the front derailleur about the first adjustment axis can be securely maintained.

In the front derailleur of the present invention, a front derailleur contact part is provided, and this contact part can be brought into contact with the mounting fixture from a direction that is different from the direction in which the adjusted front derailleur is fastened to the mounting fixture. Accordingly, any force acting on the front derailleur contact part is small. As a result, the orientation of the front derailleur about the first adjustment axis can be securely maintained.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
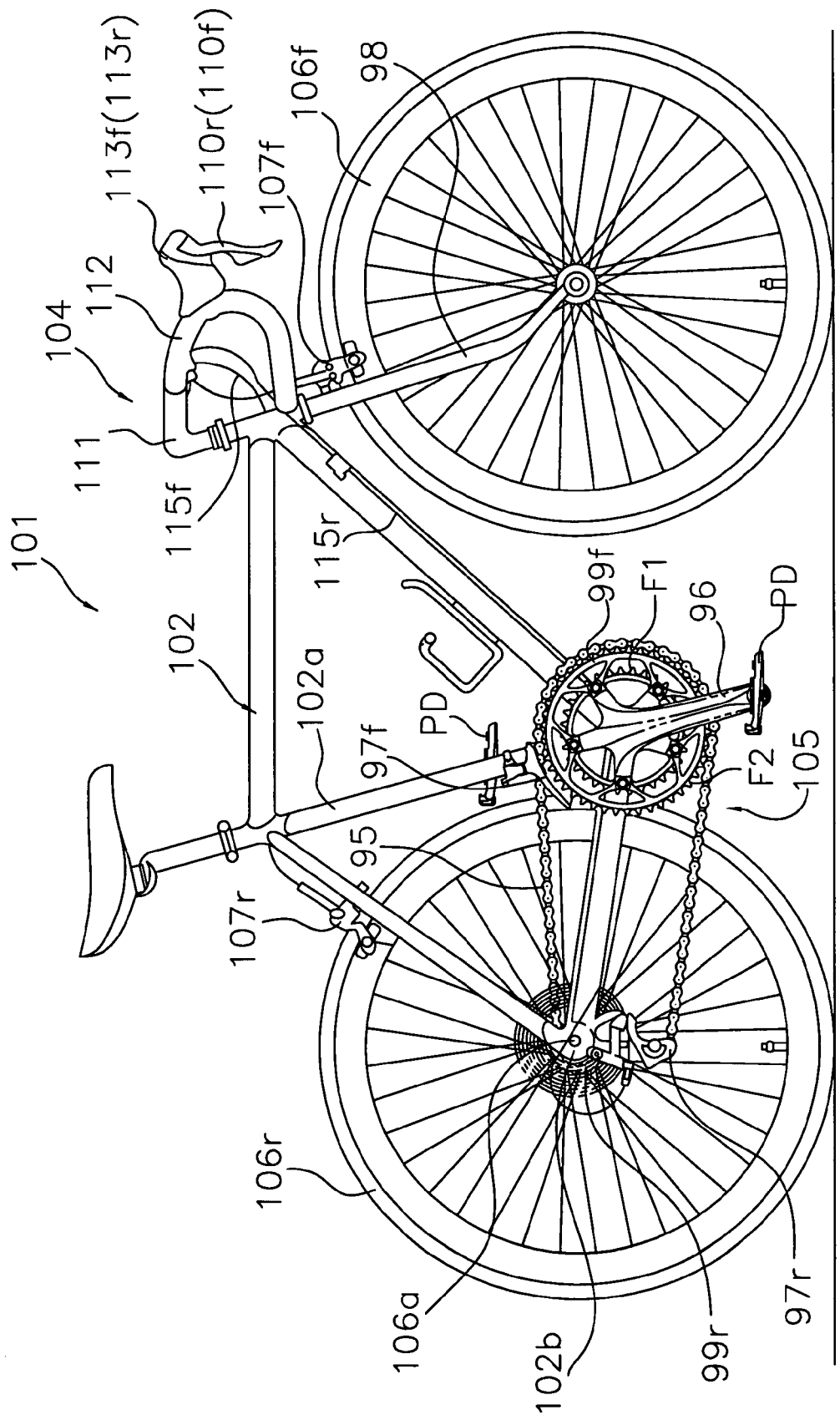
FIG. 1 is a side elevational view of a bicycle equipped with a front derailleur in accordance with a first embodiment of the present invention.

Referring initially to FIG. 1, a bicycle 101 is illustrated that is equipped in accordance with a first embodiment of the present invention.

As seen in FIG. 1, the bicycle 101 is a "road racer" (racing style road bike) that basically comprises a diamond shaped frame 102, a handlebar unit 104, a drive unit 105, a pair of front and rear wheels 106f and 106r, a pair of front and rear brake devices 107f and 107r and a pair of variable speed gearshift devices or transmission operating devices 110f and 110r. The diamond shaped frame 102 has a front fork 98 to which the handlebar unit 104 is fastened. The drive unit 105 basically includes a chain 95, a crank 96 with a pair of pedals PD, a pair of front and rear derailleurs 97f and 97r, a pair of front and rear sprocket sets 99f and 99r, and other conventional components. The front and rear wheels 106f and 106r are installed on the front fork 98 and the rear side of the frame 102, respectively, as seen in FIG. 1. The speed gearshift devices or transmission operating devices 110f and 110r are operatively coupled to the front and rear derailleurs 97f and 97r by transmission cables 115f and 115r for operating the front and rear derailleurs 97f and 97r.

The handlebar unit 104 includes a handlebar stem 111, and a handlebar 112 fixedly coupled to the upper end of the handlebar stem 111. The handlebar stem 111 is fixedly coupled to an upper end of the front fork 98. The handlebar 112 is a drop handle type handlebar equipped with left and right brake levers 113f and 113r for operating the front and rear brake devices 107f and 107r, respectively. The brake lever 113f is disposed at the right end part of the handlebar 112, and the brake lever 113r is disposed at the left end part when the bicycle 101 is viewed from behind. In the illustrated embodiment, the transmission operating parts 110f and 110r are provided on the brake levers 113f and 113r. The transmission operating parts 110f and 110r are connected to the front and rear derailleurs 97f and 97r via the transmission cables 115f and 115r.

The front derailleur 97f is provided on a seat tube 102a of the frame 102, and guides the chain 95 so as to position the chain at one of two shift positions via the transmission operating part 110f. The rear derailleur 97r is provided on the rear hook part 102b of the frame 102, and guides the chain 95 so as to position the chain at one of ten shift positions via the transmission operating part 105r.

The front sprocket group 99f has two sprockets F1 and F2, which have different numbers of gear teeth, arranged in the axial direction of the crank shaft. The rear sprocket group 99r has ten sprockets, which have different numbers of gear teeth, arranged in the axial direction along a hub shaft 106a of the rear wheel. In the front sprocket group 99f, the inside sprocket F1 has fewer gear teeth than the outside sprocket F2. Furthermore, in the rear sprocket group 99r, the sprockets have fewer gear teeth sequentially from the innermost side, and the top outermost sprocket has the fewest gear teeth. The front and rear derailleurs 97f and 97r move the chain 95 to any among the plurality of sprockets to accomplish the gear shifting operation. The gear shifting operation is accomplished by the transmission operation parts 110f and 110r using the brake levers 113f and 113r.

Construction of Front Derailleur and Mounting Fixture

Figure 2:
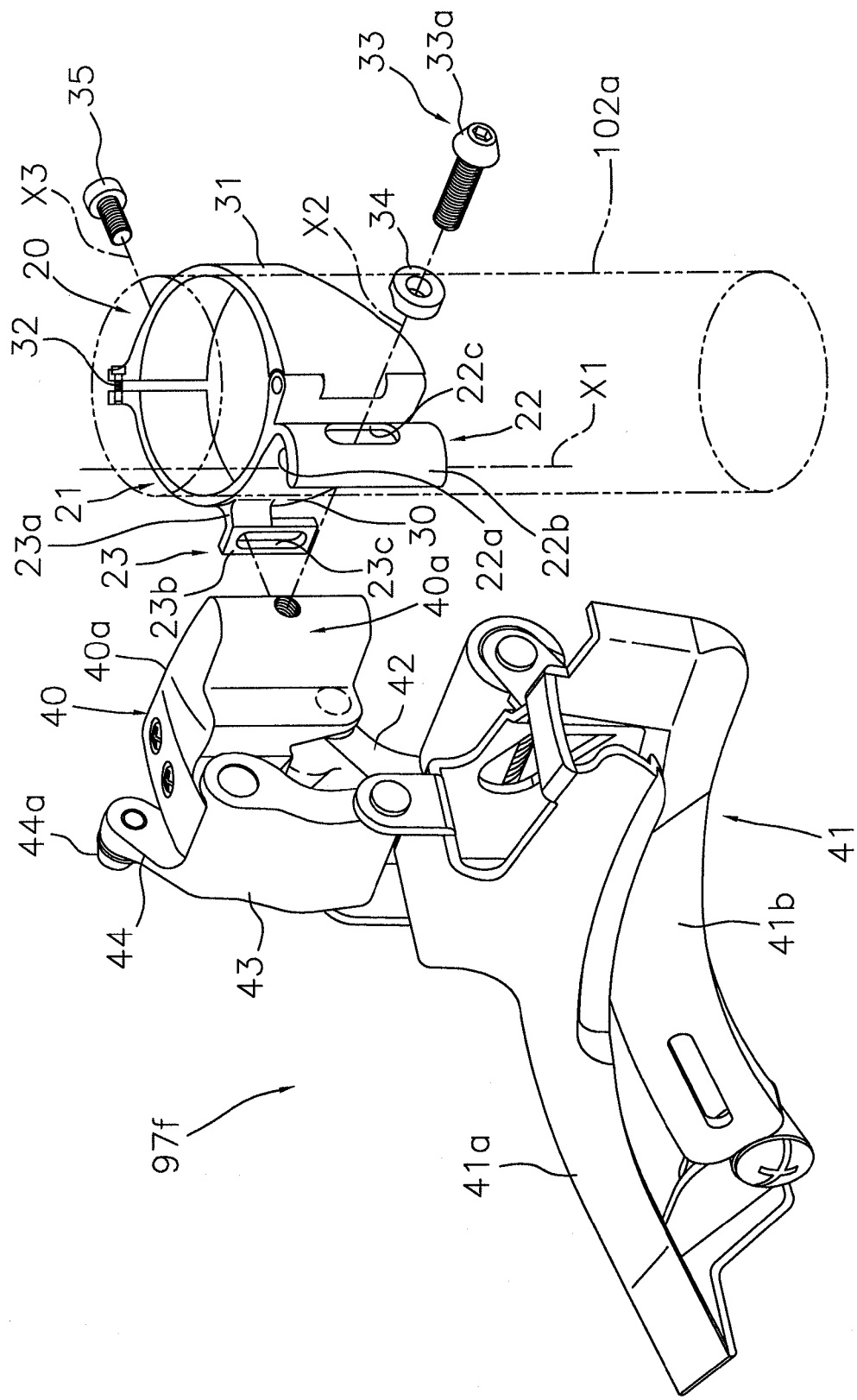
FIG. 2 is an exploded perspective view of the front derailleur and the mounting fixture for the front derailleur in accordance with a first embodiment of the present invention.

As shown in FIG. 2, the front derailleur 97f is a down-swing-type derailleur that includes a mounting fixture 20 which is fastened to the seat tube 102a (one example of a tubular member) to support the front derailleur 97f in a desired angular orientation. The front derailleur 97f basically includes a base bracket or base member 40, a chain guide 41, an inner link 42 and an outer link 43. The base member 40 is fixedly mounted on the seat tube 102a. The chain guide 41 is configured to move between a retracted position and an extended position relative to the base member 40.

Figure 3:
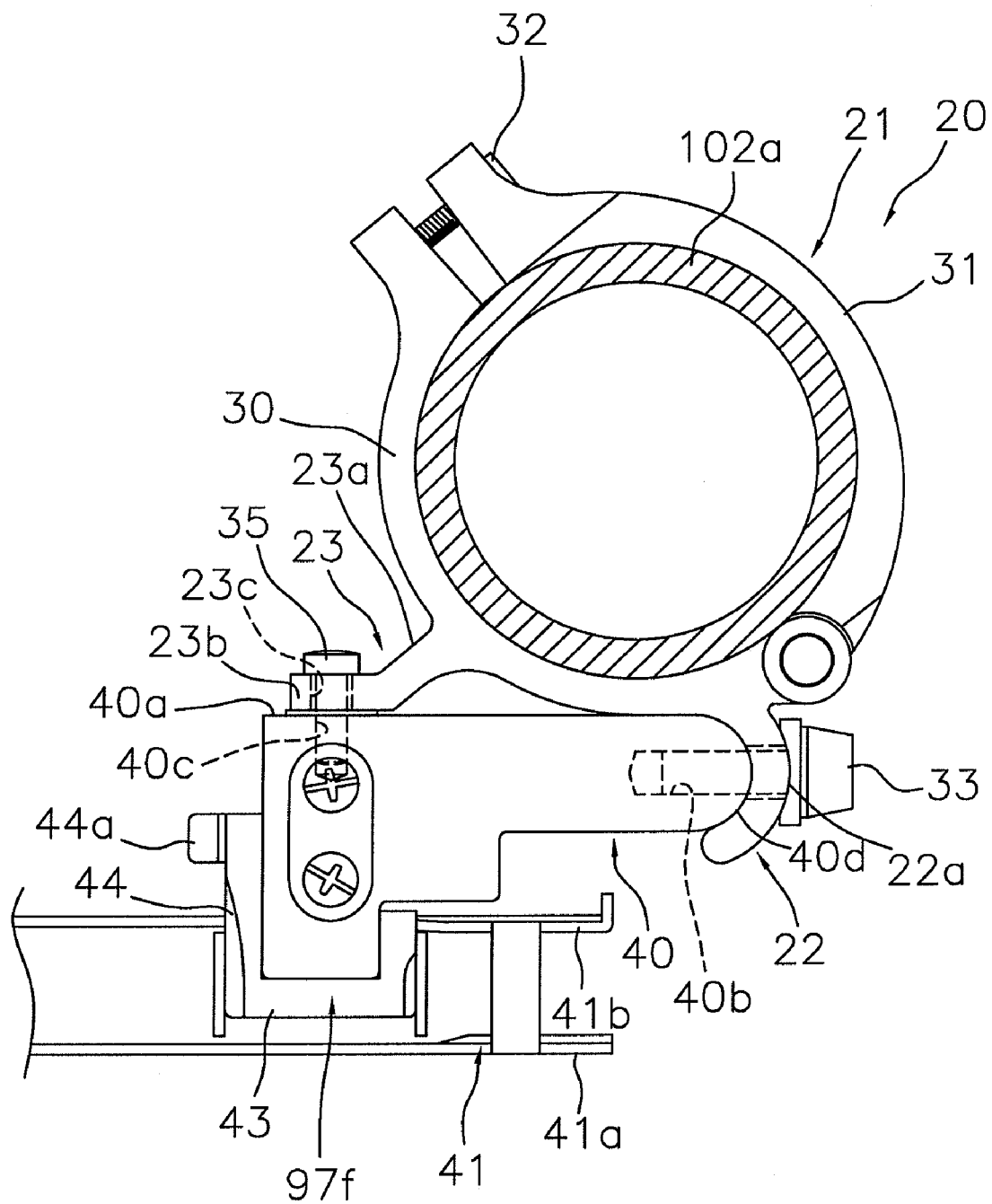
FIG. 3 is a top plan view of the front derailleur and the mounting fixture for the front derailleur in accordance with a first embodiment of the present invention.

As shown in FIGS. 2 and 3, for example, the mounting fixture 20 is a member that is made of a metal such as stainless steel or the like, or a synthetic resin such as a fiber-reinforced resin or the like. This mounting fixture 20 has a bicycle frame fastening part 21 that can be fastened to the seat tube 102a, a front derailleur mounting part 22 that is disposed on the bicycle frame fastening part 21 and that can fasten the front derailleur 97f in place, and a front derailleur contact part 23 that can come into contact with the a portion of the front derailleur located on the side that faces the seat tube 102a.

The bicycle frame fastening part 21 is formed so as to surround the entire seat tube 102a, and is fastened to the seat tube 102a by band clamping. The bicycle frame fastening part 21 basically includes a first band clamping member 30 and a second band clamping member 31. The first band clamping member 30 has a substantially semicircular shape as seen in a top plan view so as to surround half of the circumference of the seat tube 102a. Likewise, the second band clamping member 31 has a substantially semicircular shape as seen in a top plan view so as to surround half of the circumference of the seat tube 102a. The second band clamping member 31 is connected to the first band clamping member 30 so as to swing freely. In other words, the first and second clamping members 30 and 31 are pivotally coupled together so as to be capable of opening and closing, and enclose the seat tube 102a therebetween. The first band clamping member 30 and the second band clamping member 31 have free ends that are detachably and reattachably connected by a tightening bolt 32.

The front derailleur mounting part 22 can fasten the front derailleur 97f so that adjustment is possible in the vertical direction and so that fine adjustment is possible about a first adjustment axis X1, which is parallel to the seat tube 102a and is disposed at a distance from the seat tube 102a. For example, the front derailleur mounting part 22 is fastened to the first band clamping member 30 of the bicycle frame fastening part 21 by welding. The front derailleur mounting part 22 is formed by bending a long plate-form member in the vertical direction about the first adjustment axis X1. Accordingly, the circular arcuate surfaces 22a and 22b are centered substantially on the first adjustment axis X1 such that the circular arcuate surfaces 22a and 22b are formed on both sides of the front derailleur mounting part 22 with respect to the forward-rearward direction. Moreover, a slot 22c which is used to fasten the front derailleur 97f so that adjustment is possible in the vertical direction is formed in the front derailleur mounting part 22. The slot 22c allows a first fastening bolt 33, which is used to fasten the front derailleur 97f, to pass through from a first fastening direction that runs along a second mounting axis X2 orthogonal to the first adjustment axis X1. The width of the slot 22c is a dimension that is considerably larger than the external diameter of the first fastening bolt 33, so that the first fastening bolt 33 can pass through at an inclination.

The front derailleur contact part 23 has an arm part 23a that extends substantially in the direction of diameter from the first band clamping member 30, and a connecting part 23b which is disposed on the distal end of the arm part 23a. The connecting part 23b is connected to the front derailleur 97f by a second fastening bolt 35. In particular, the connecting part 23b is fastened to a side surface 40a (portion disposed on the side facing the tubular member) of the base member 40 (described later) of the front derailleur 97f on the side facing on the seat tube 102a so that contact is possible and so that this connecting part 23b can be freely detached from the base member 40. A slot 23c through which the second fastening bolt 35 can pass is formed in the connecting part 23b. The slot 23c has the same vertical length as the slot 22c. After passing through the slot 23c, the second fastening bolt 35 is screwed into the base member 40, thus making it possible to maintain the orientation about the first adjustment axis X1. Furthermore, in cases where a gap is created between the connecting part 23b and the side surface 40a of the base member 40 by the adjustment in the front derailleur mounting part 22 about the first adjustment axis X1, a member such as a shim, washer or the like (not numbered) can be interposed in this gap as seen in FIG. 3.

As mentioned above, the base member 40 of the front derailleur 97f is attached to the mounting fixture 20, while the chain guide 41 is free to move in the gear shift direction toward or away from the base member 40 via the inner and outer links 42 and 43 which are disposed parallel to each other and rotatably connect the base member 40 and the chain guide 41. As explained below, the angular orientation of the chain guide 41 is adjustable with respect to the base member 40 of and the mounting fixture 20 about the first adjustment axis X1.

In the illustrated embodiment, the distal end part of the base member 40 constitutes a mounting fixture engaging part 40d that is formed in a curved arcuate shape as seen in a plan view so as to conform to the curved arcuate surface 22a of the front derailleur mounting part 22. A screw hole 40b is formed in the distal surface of the mounting fixture engaging part 40d of the base member 40 for threadedly receiving the first fastening bolt 33. The first fastening bolt 33 and the screw hole 40b constitute a fastening structure of the base member 40. A screw hole 40c (see FIG. 3) is formed in the side surface 40a of the base member 40 located on the side of the seat tube 102a. The second fastening bolt 35 is screwed into the screw hole 40c of the side surface 40a of the base member 40. In the illustrated embodiment, the second fastening bolt 35 and the screw hole 40c constitute a mounting fixture contact part of the base member 40.

The chain guide 41 guides the chain 95 to either of the two sprockets F1 and F2 by moving between two shift positions that include a low shift position disposed over the small diameter or inside sprocket F1, and a top shift position disposed over the large diameter or outside sprocket F2. The chain guide 41 is connected to the outer ends of the inner link 42 and the outer link 43 so as to move between the retracted position and the extended position relative to the base member 40. The inner link 42 and the outer link 43 are pivotally coupled at their inner ends to the base member 40 and pivotally coupled at their outer ends to the chain guide 41. The inner link 42 and the outer link 43 are arranged so as to be parallel to each other. Thus, the inner and outer links 42 and 43 form a four bar linkage assembly with the base member 40 and the chain guide 42 in order to move the chain guide 41 between the retracted position and the extended position. In the present embodiment, the chain guide 41 has an outer plate 41a and an inner plate 41b defining a chain receiving slot therebetween. The outer plate 41a is disposed on the outside (the side distant from the seat tube 102a), and the inner plate 41b is disposed on the inside.

As shown in FIG. 2, the inner link 42 is disposed beneath the base member 40 in a state in which the base member 40 is mounted on the seat tube 102a, and both ends of this link are connected to the base member 40 and chain guide 41 in a manner that allows the link to pivot freely. One end of the inner link 42 is connected to the base member 40 so that the inner link 42 can swing freely. The chain guide 41 is connected to the other end of the inner link 42 so that the chain guide can swing freely.

The outer link 43 is a link which is disposed parallel to the inner link 42 and in which both ends of the link are connected to the base member 40 and the chain guide 41 in positions that are more distant from the base member 40 than the inner link 42 is, so that outer link 43 can pivot freely. A cable anchoring arm 44, which is separated from the base member 40 and which is bent and extended toward the seat tube 102a, is formed as an integral part of the outer link 43. A cable anchoring part 44a for bolting down the inner cable of the gear shift cable is disposed on the extended distal end of the cable anchoring arm 44.

When the front derailleur 97f thus configured is to be attached to the mounting fixture 20, the mounting fixture 20 is first fastened to the seat tube 102a in an appropriate position. At this time, the circular arcuate surfaces 22a and 22b of the front derailleur mounting part 22 are disposed facing substantially forward and rearward. The front derailleur 97f is then attached to the front derailleur mounting part 22 by the first fastening bolt 33. At this time, attachment is performed with the first fastening bolt 33 in a lightly tightened state so that the vertical position can be adjusted and adjustment about the first adjustment axis X1 can be accomplished. The vertical position is then adjusted so that the gap between the addendum circle of the large-diameter sprocket F2 and the lower edge part of the outer plate 41a is approximately 1 to 3 mm, and the orientation about the first adjustment axis X1 is adjusted so that the outer plate 41a is disposed in a position directly above the sprocket F2 and parallel to the sprocket F2.

When such adjustments are completed, the first fastening bolt 33 is tightened. An appropriate condition is established if the side surface 40a of the base member 40 of the front derailleur 97f is in contact with the front derailleur contact part 23 in this state. On the other hand, in cases where a gap is formed, this gap is filled with a shim or washer, and the second fastening bolt 35 is tightened. The attachment work of the front derailleur 97f is thereby completed.

It is also possible to attach the front derailleur 97f to the mounting fixture 20 beforehand, and then to attach the mounting fixture 20 to the seat tube 102a afterward, in the same manner as in a device in which an ordinary band part is attached to the front derailleur as an integral part. In such a case, it is desirable to attach the front derailleur 97f to the mounting fixture 20 in a state in which the side surface 40a of the base member 40 is brought into contact with the front derailleur contact part 23. To attach the mounting fixture 20 to the seat tube 102a, it is sufficient to move the mounting fixture 20 vertically and about the seat tube 102a, and to make an attachment in the state described above.

The front derailleur contact part 23 in contact with the side surface 40a disposed on the front derailleur on the side facing the seat tube (102a) is located in a position that differs from that of the front derailleur mounting part 22 of the mounting fixture 20, and any force that acts on the front derailleur contact part 23 is therefore small. As a result, the orientation of the front derailleur 97f about the first adjustment axis X1 can be securely maintained without providing any special structure.

Furthermore, since the front derailleur 97f can be fastened by means of two orthogonal fastening bolts 33 and 35, there is no variation in the orientation of the front derailleur 97f adjusted about the first adjustment axis X1, even if a force acts on the front derailleur 97f via the chain 95 in a direction that causes the front derailleur to move toward or away from the seat tube 102a.

Second Embodiment

Figure 4:
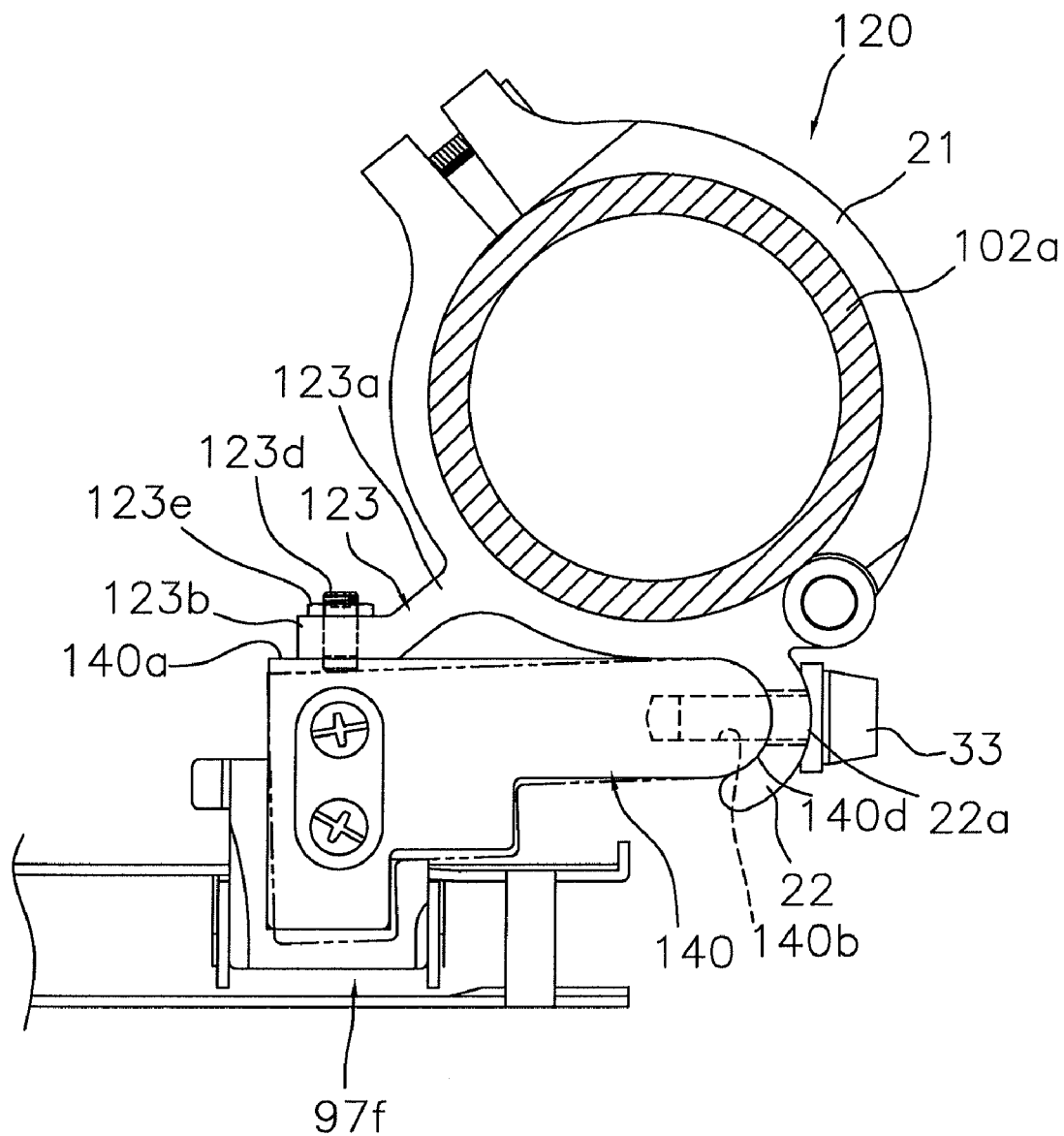
FIG. 4 is a top plan view, similar to FIG. 3, of the front derailleur and a mounting fixture for the front derailleur in accordance with a second embodiment of the present invention.

Referring now to FIG. 4, the front derailleur 97f is mounted to the seat tube 102a using a modified mounting fixture 120 in accordance with a second illustrated embodiment. In view of the similarity between the first and second illustrated embodiments, the parts of the second illustrated embodiment that are identical to the parts of the first illustrated embodiment will be given the same reference numerals as the parts of the first illustrated embodiment. Moreover, the descriptions of the parts of the second illustrated embodiment that are identical to the parts of the first illustrated embodiment may be omitted for the sake of brevity.

In the abovementioned embodiment, the connecting part 23b was installed on the front derailleur contact part 23 of the mounting fixture 20. However, as shown in FIG. 4, it would also be possible to provide a front derailleur contact part 123 of the mounting fixture 120 with an advancing and retracting part 123b that comes into contact with the front derailleur 97f in a manner that allows advance and retraction. Furthermore, in the following description, since all of the components other than the front derailleur contact part 123 are the same as in the abovementioned embodiment, descriptions of these elements are omitted.

The advancing and retracting part 123b is disposed on the distal end of the arm part 123a. For example, the advancing and retracting part 123b has a screw member 123d shaped as a set screw having a hexagonal socket, and screwed into the distal end of the arm part 123a, and also has a lock nut 123e that is used to turn and fasten this screw member 123d. The screw member 123a is screwed in so that this screw member can come into contact with the side surface 140a of the base member 140 of the front derailleur 97f. This screw member 123d is disposed so that when the mounting of the front derailleur 97f is completed and a gap is created between the side surface 40a of the front derailleur 97f and the arm part 123a as indicated by the two-dot chain line in FIG. 4, the screw member 123d advances by an amount equal to this gap, and causes the front derailleur contact part 123 to contact the side surface 40a. The lock nut 123e is installed in order to prevent turning of the advanced screw member 123d. In the illustrated embodiment, the screw member 123d and the lock nut 123e constitute a mounting fixture contact part of the base member 140. In such an embodiment, the front derailleur contact part 123 can be securely brought into contact with the front derailleur 97f that is adjusted about the first adjustment axis X1 by turning the screw, so that the orientation of the front derailleur 97f can be securely maintained. The distal end part of the base member 140 constitutes a mounting fixture engaging part 140d that is formed in a curved arcuate shape as seen in a plan view so as to conform to the curved arcuate surface 22a of the front derailleur mounting part 22. A screw hole 140b is formed in the distal surface of the mounting fixture engaging part 140d of the base member 140 for threadedly receiving the first fastening bolt 33. The first fastening bolt 33 and the screw hole 140b constitute a fastening structure of the base member 140. Furthermore, since it is not necessary to machine the front derailleur 97f in any way, a post-adjustment change in the orientation about the first adjustment axis X1 can be prevented in the case of existing front derailleurs.

Third Embodiment

Figure 5:
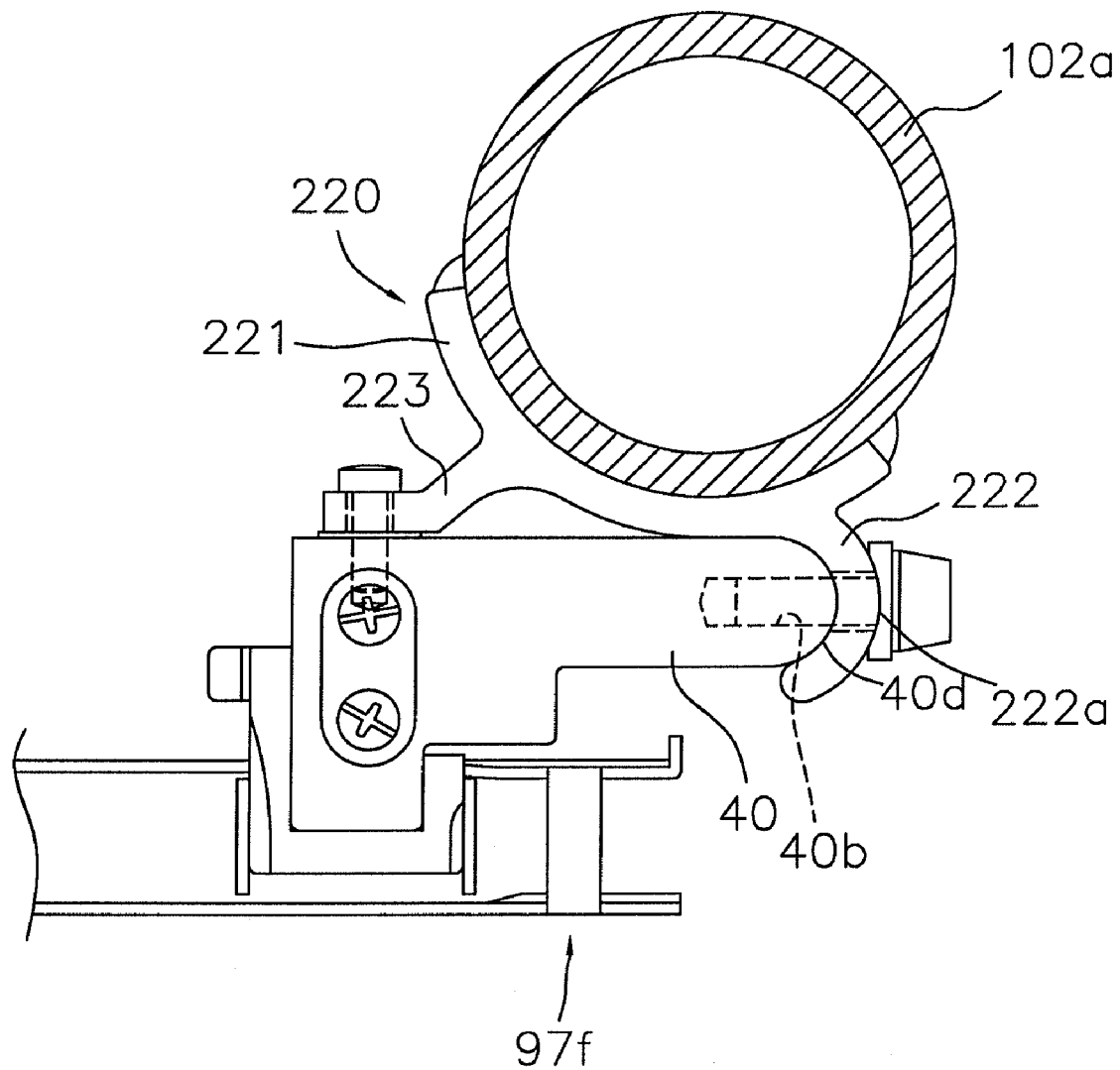
FIG. 5 is a top plan view, similar to FIG. 3, of the front derailleur and a mounting fixture for the front derailleur in accordance with a third embodiment of the present invention.

Referring now to FIG. 5, the front derailleur 97f is mounted to the seat tube 102a using a modified mounting fixture 220 in accordance with a third illustrated embodiment. In view of the similarity between the first and third illustrated embodiments, the parts of the third illustrated embodiment that are identical to the parts of the first illustrated embodiment will be given the same reference numerals as the parts of the first illustrated embodiment. Moreover, the descriptions of the parts of the third illustrated embodiment that are identical to the parts of the first illustrated embodiment may be omitted for the sake of brevity.

In the first and second embodiments, the front derailleur mounting part is fastened to the seat tube 102a by band clamping. However, as shown in FIG. 5, it is also possible to fasten the mounting fixture 220 to the seat tube 102a by fastening means such as welding or the like. This mounting fixture 220 has a bicycle frame fastening part 221 that can be fastened to the seat tube 102a by welding, a front derailleur mounting part 222 that is disposed on the bicycle frame fastening part 221 and that can fasten the front derailleur 97f in place, and a front derailleur contact part 223 that can come into contact with the a portion of the front derailleur located on the side that faces the seat tube 102a. In the illustrated embodiment, the distal end part of the base member 40 constitutes a mounting fixture engaging part 40d that is formed in a curved arcuate shape as seen in a plan view so as to conform to the curved arcuate surface 222a of the front derailleur mounting part 222. The components other than the bicycle frame fastening part 221 of the mounting fixture 220 are the same as in the first embodiment, and descriptions of these elements are omitted.

The bicycle frame fastening part 221 has a size that allows mounting on the outer circumferential surface equal to approximately a quarter circle of the seat tube 102a. The circumference of the bicycle frame fastening part 221 is welded to the seat tube 102a. In the case of such a construction, the position of the mounting fixture 220 cannot be adjusted later, and the orientation of the front derailleur 97f is therefore adjusted by the front derailleur mounting part 222.

Fourth Embodiment

Figure 6:
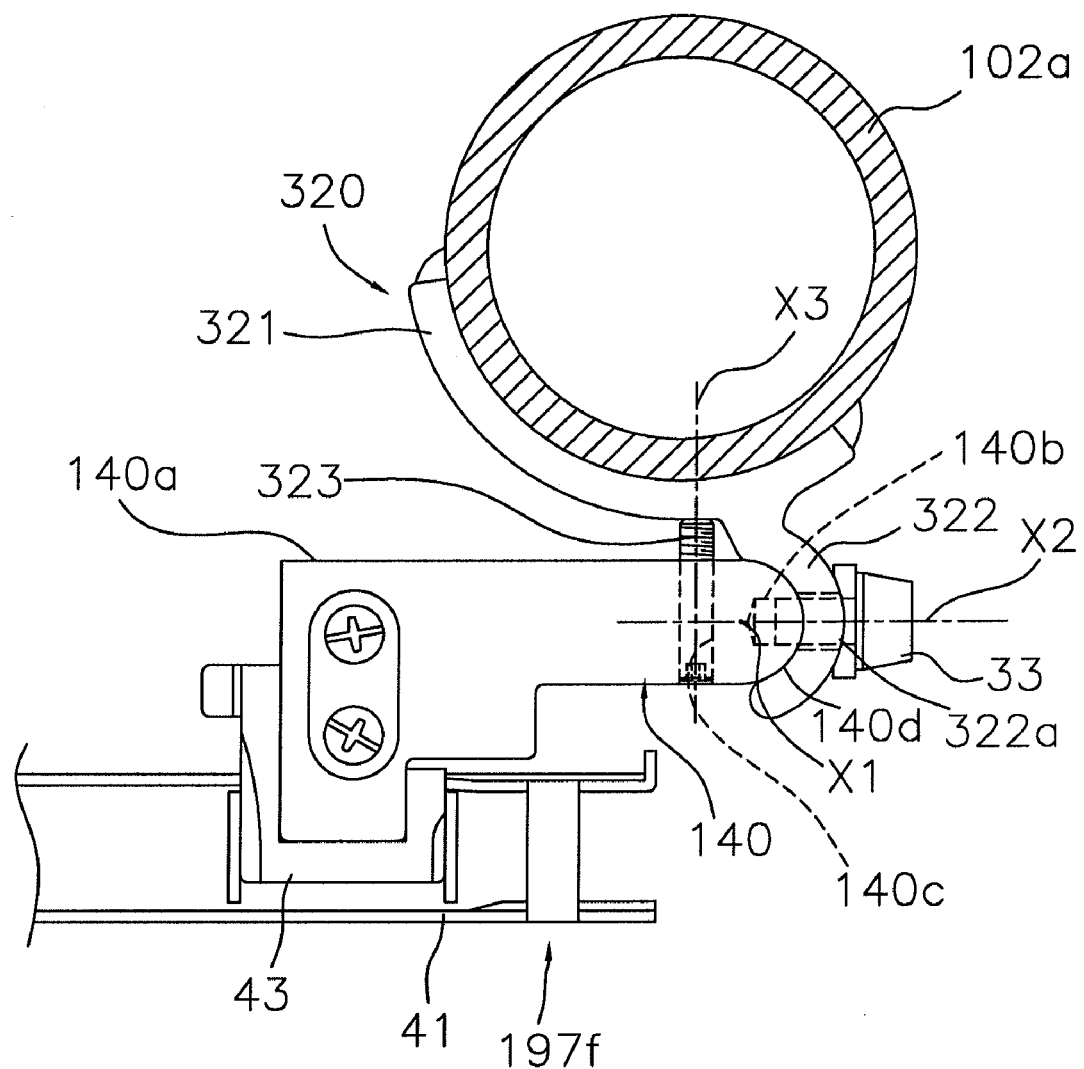
FIG. 6 is a top plan view, similar to FIG. 3, of the front derailleur and a mounting fixture for the front derailleur in accordance with a fourth embodiment of the present invention.

Referring now to FIG. 6, a front derailleur 197f is mounted to the seat tube 102a using a modified mounting fixture 320 in accordance with a fourth illustrated embodiment. In view of the similarity between the first and fourth illustrated embodiments, the parts of the fourth illustrated embodiment that are identical to the parts of the first illustrated embodiment will be given the same reference numerals as the parts of the first illustrated embodiment. Moreover, the descriptions of the parts of the fourth illustrated embodiment that are identical to the parts of the first illustrated embodiment may be omitted for the sake of brevity.

In the abovementioned embodiment, a detachable fastening part or an advancing and retracting part was installed on the front derailleur contact part, but it is also possible to omit these and to merely establish contact the side surface 140a. In this case, if a gap is created between the front derailleur contact part and the side surface, the system may be devised so that a member that fills this gap is mounted on the front derailleur contact part.

In the abovementioned embodiment, a front derailleur contact part in contact with the front derailleur 97f was disposed on the side of the mounting fixture, but it is also possible to dispose a front derailleur contact part 320 on the front derailleur 97f, as shown in FIG. 6.

The mounting fixture 320 has a bicycle frame fastening part 321 that can be fastened to the seat tube 102a, and a front derailleur mounting part 322 that is disposed on the bicycle frame fastening part 221 and can be fastened to the front derailleur 197f. For example, the bicycle frame fastening part 321 is fastened to the seat tube 102a by fastening means such as welding or the like in the same manner as in the third embodiment. The front derailleur mounting part 322 has a circular arcuate surface that is used to allow the front derailleur 197f to be finely adjusted about the first adjustment axis similar to all the prior embodiments.

The front derailleur 197f has a base member 140, the chain guide 41, the inner link 42 and the outer link 43, and a front derailleur contact part 323. In the illustrated embodiment, the distal end part of the base member 140 constitutes a mounting fixture engaging part 140d that is formed in a curved arcuate shape as seen in a plan view so as to conform to the curved arcuate surface 322a of the front derailleur mounting part 322. A screw hole 140b is formed in the distal surface of the mounting fixture engaging part 140d of the base member 40 for threadedly receiving the first fastening bolt 33. The first fastening bolt 33 and the screw hole 140b constitute a fastening structure of the base member 140. The front derailleur contact part 323 and the screw hole 140c constitute a mounting fixture contact part of the base member 140. Among these, the chain guide 41 and the inner and outer links 42 and 43 have the same constructions as in the abovementioned embodiment, and a description of these parts is therefore omitted.

A screw hole 140b that is used for fastening by a first fastening bolt 33 in the direction of the axis X2 orthogonal to the first adjustment axis is formed in the base member 140, and a screw hole 140c is formed along a third displacement axis X3 that is orthogonal to the first adjustment axis X1 and the second mounting axis X2. The front derailleur contact part 323 constructed using a bolt member having the configuration of a set screw equipped with a recessed hexagonal socket is mounted in this screw hole 140c so that the front derailleur contact part is free to advance and retract. A hexagonal recessed socket that can be turned by an Allen key is formed in the base end (lower end in FIG. 6) of the front derailleur contact part 323, and the distal end can come into contact with the outer circumferential surface of the bicycle frame fastening part 321 of the mounting fixture 320. The base end of the portion of the front derailleur contact part 323 in which the hexagonal recessed socket is formed is ordinarily disposed so as to be hidden from the outside surface of the base member 140.

When a front derailleur 197f having such a construction is to be attached to a mounting fixture 320 that has been fastened beforehand, the front derailleur 197f is attached to the front derailleur mounting part 322 by the first fastening bolt 33. In this case, the attachment is made with the first fastening bolt 33 in a lightly tightened state, so that the vertical position can be adjusted and adjustment about the first adjustment axis X is possible. The vertical position is then adjusted so that the gap between the addendum circle of the large-diameter sprocket F2 and the lower edge part of the outer plate 41a is approximately 1 to 3 mm, and the orientation about the first adjustment axis X1 is adjusted so that the outer plate 41a is disposed in a position directly above the sprocket F2 and parallel to the sprocket F2. When the adjustments are thus completed, the first fastening bolt 33 is tightened. In cases where a gap is formed between the front derailleur contact part 323 and the bicycle frame fastening part 321 of the mounting fixture 320 in this state, the set screw that is equipped with a recessed hexagonal socket and constitutes the front derailleur contact part 323 is caused to advance and to come into contact with the bicycle frame fastening part 321 of the mounting fixture 320. The attachment work of the front derailleur 197f is thereby completed.

Here, the front derailleur contact part 323 is installed in the front derailleur 197f, and this contact part 323 is brought into contact with the mounting fixture 320 from a direction that differs from the direction in which the completely adjusted front derailleur 197f is fastened to the mounting fixture. Accordingly, any force acting on the front derailleur contact part 323 is small. As a result, the orientation of the front derailleur 197f about the first adjustment axis X1 can be securely maintained.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle front derailleur mounting fixture comprising:
a bicycle frame fastening part configured and arranged to be fastened to a tubular member of a bicycle frame;
a front derailleur mounting part coupled to the bicycle frame fastening part, with the front derailleur mounting part being configured and arranged to fasten a front derailleur for limited rotation adjustment about an adjustment axis disposed at a distance from the tubular member; and
a front derailleur contact part disposed on a side of the front derailleur mounting part which faces the bicycle frame fastening part when the bicycle front derailleur mounting fixture is in an installed position in which a bicycle having the front derailleur mounting fixture is positioned to be ridden,
the front derailleur contact part contacting a part of the front derailleur facing the tubular member in a horizontal position that differs from that of the bicycle frame fastening part with respect to the front derailleur in the installed position such that fine adjustment of an angular position of the front derailleur is achieved using the front derailleur contact part in conjunction with the front derailleur mounting part,
the front derailleur contact part being movably adjustable in a horizontal direction along a displacement axis that is transverse to the adjustment axis while the front derailleur mounting part is fixed securely to the front derailleur and
the front derailleur contact part being adjustably movable with respect to the front derailleur mounting part between at least two secure positions along the displacement axis.

2. The bicycle front derailleur mounting fixture according to claim 1, wherein
the front derailleur contact part includes an advancing and retracting part that selectively advances and retracts the front derailleur relative to the bicycle frame fastening part.

3. The bicycle front derailleur mounting fixture according to claim 2, wherein
the advancing and retracting part includes a screw.

4. The bicycle front derailleur mounting fixture according to claim 1, wherein
the front derailleur contact part includes a bolt member arranged to be connected to the front derailleur.

5. The bicycle front derailleur mounting fixture according to claim 1, wherein
the bicycle frame fastening part includes a partial arcuate member with free ends that are configured to be welded to the tubular member.

6. The bicycle front derailleur mounting fixture according to claim 1, wherein
the bicycle frame fastening part includes a band clamping arrangement.

7. The bicycle front derailleur mounting fixture according to claim 1, wherein
the front derailleur mounting part is configured to swingably mount the front derailleur to swing freely about the adjustment axis which is disposed parallel to a center axis of the tubular member.

8. The bicycle front derailleur mounting fixture according to claim 2, wherein
the front derailleur contact part includes a bolt member arranged to be connected to the front derailleur.

9. The bicycle front derailleur mounting fixture according to claim 2, wherein
the front derailleur mounting part is configured to swingably mount the front derailleur to swing freely about the adjustment axis which is disposed parallel to a center axis of the tubular member.

10. A bicycle front derailleur comprising:
a base member including a mounting fixture engaging part with a curved arcuate surface that defines an adjustment axis and a fastening structure that defines a mounting axis that is orthogonal to the adjustment axis;
a chain guide configured to move between a retracted position and an extended position relative to the base member;
a linkage assembly coupled between the base member and the chain guide in order to move the chain guide between the retracted position and the extended position; and
a mounting fixture contact part disposed on a side of the mounting fixture engaging part which faces a tubular member of a bicycle frame of a bicycle having the front derailleur when the bicycle front derailleur is in an installed position,
the mounting fixture contact part being disposed on a side of the base member to advance and retract with respect to the base member in a direction along a displacement axis that is generally orthogonal to the adjustment axis and the mounting axis such that fine adjustment of an angular position of the front derailleur is achieved about the adjustment axis by moving the mounting fixture contact part,
the mounting fixture contact part being movably adjustable in a horizontal direction along the displacement axis while the mounting fixture engaging part is fixed securely to the bicycle, and
the mounting fixture contact part being adjustably movable with respect to the mounting fixture engaging part between at least two secure positions along the displacement axis to selectively pivot the base member in the horizontal direction about the adjustment axis.

11. The bicycle front derailleur according to claim 10, wherein the mounting fixture contact part of the base member includes a screw hole that is formed along the direction of the displacement axis, and a bolt member that is screwed into the screw hole.

12. The bicycle front derailleur according to claim 11, wherein the screw hole extends through the base member in the direction of the displacement axis, and the bolt member is a set screw having a recessed hexagonal socket.

* * * * *